US007889190B2

(12) United States Patent
Woo

(10) Patent No.: US 7,889,190 B2
(45) Date of Patent: Feb. 15, 2011

(54) APPARATUS FOR SUPPLYING POWER SOURCE

(75) Inventor: Kyoung Don Woo, Gunpo (KR)

(73) Assignee: LG Display Co., Ltd., Seoul (KR)

( * ) Notice: Subject to any disclaimer, the term of this patent is extended or adjusted under 35 U.S.C. 154(b) by 860 days.

(21) Appl. No.: 11/435,765

(22) Filed: May 18, 2006

(65) Prior Publication Data

US 2006/0284864 A1 Dec. 21, 2006

(30) Foreign Application Priority Data

Jun. 17, 2005 (KR) ...................... 10-2005-0052659

(51) Int. Cl.
*G06F 3/038* (2006.01)

(52) U.S. Cl. ........................................ 345/212; 345/1.1

(58) Field of Classification Search ........... 345/1.1–3.4, 345/211–213; 455/571–574; 713/300–340; 323/215

See application file for complete search history.

(56) References Cited

U.S. PATENT DOCUMENTS

| | | | | |
|---|---|---|---|---|
| 5,841,431 | A | 11/1998 | Simmers | |
| 5,966,002 | A * | 10/1999 | Barrieau et al. | 323/222 |
| 6,031,362 | A * | 2/2000 | Bradley | 323/269 |
| 6,411,154 | B1 * | 6/2002 | Mikulenka | 327/530 |
| 6,703,813 | B1 * | 3/2004 | Vladislav et al. | 323/270 |
| 7,167,054 | B1 * | 1/2007 | Dening et al. | 330/297 |
| 7,173,377 | B2 * | 2/2007 | Park et al. | 315/169.1 |
| 2002/0097194 | A1 * | 7/2002 | Uchida et al. | 345/3.1 |
| 2002/0105510 | A1 * | 8/2002 | Tsuchiya | 345/211 |
| 2004/0183745 | A1 * | 9/2004 | Choi | 345/1.1 |
| 2004/0189095 | A1 | 9/2004 | Lin et al. | |
| 2005/0258772 | A1 | 11/2005 | Park et al. | |

FOREIGN PATENT DOCUMENTS

| | | |
|---|---|---|
| CN | 2069581 | 1/1991 |
| CN | 1532801 | 9/2004 |
| KR | 10-2002-0054563 A | 7/2002 |

* cited by examiner

*Primary Examiner*—Amr Awad
*Assistant Examiner*—Aaron Midkiff
(74) *Attorney, Agent, or Firm*—Morgan, Lewis & Bockius LLP

(57) ABSTRACT

The present invention relates to an apparatus for supplying power source for providing power source to a plurality of display devices. The apparatus for supplying power source includes a boosting circuit and a voltage adjusting circuit. The boosting circuit boosts a battery voltage to a first voltage, and supplies the first voltage to a first display device. The voltage adjusting circuit adjusts the first voltage to a second voltage, and supplies the second voltage to a second display device. The apparatus supplies a voltage outputted from a boosting circuit to a first display device, downs the voltage through a voltage adjusting circuit, and then supplies the downed voltage to a second display device. In other words, the apparatus of the present invention may provide voltages having different magnitude to a plurality of display devices, respectively.

14 Claims, 3 Drawing Sheets

APPARATUS FOR SUPPLYING POWER SOURCE

BACKGROUND OF THE INVENTION

1. Field of the Invention

The present invention relates to an apparatus for supplying power source. More particularly, the present invention relates to an apparatus for supplying power source for providing power source to a plurality of display devices.

2. Description of the Related Art

An apparatus for supplying power source means apparatus for supplying power source required for driving a display device.

FIG. 1 is a view illustrating a circuitry of a common apparatus for supplying power source.

In FIG. 1, the apparatus for supplying power source 102 includes a boosting circuit 110 and a boosted voltage detecting circuit 112.

The boosting circuit 110 includes a boosting integrated chip 114, and boosts a battery voltage provided from a battery 104, e.g. voltage of about 3.7V to a predetermined voltage, e.g. voltage of about 18V.

The boosted voltage detecting circuit 112 detects the battery voltage boosted by the boosting circuit 110, i.e. voltage of a second node N2 and a voltage of a third node N3, and provides the voltage of the third node N3 to feedback terminal FB of the boosting integrated chip 114. The boosted voltage detecting circuit 112 includes a first capacitor C1, a second diode D2, a first resistor R1, a second capacitor C2 and a third capacitor C3.

The first capacitor C1 is coupled to the boosting circuit 110 and the display device 100, and the second diode D2 is coupled to the first capacitor C1 and the FB of the boosting integrated chip 114. Thus, the first capacitor C1 and the second diode D2 make the voltage of the third node N3 inputted to FB of the boosting integrated chip 114 stabilize.

The second and third capacitors C2 and C3 make the voltage of the second node N2 supplied to the display device 100 stabilize.

The boosting integrated chip 114 adjusts its boosting ratio in accordance with the voltage of the third node N3 provided from the boosted voltage detecting circuit 112.

In brief, the apparatus 102 may provide a predetermined voltage to only one display device 100.

However, recently, a dual panel apparatus such as a mobile terminal and a laptop, etc. employs two display devices, and thus should include two apparatuses for providing power source so as to drive the display devices. Accordingly, the size of the dual panel apparatus may be increased.

SUMMARY OF THE INVENTION

It is a feature of the present invention to provide an apparatus for supplying power source to a plurality of display devices.

An apparatus for supplying power source according to one embodiment of the present invention includes a boosting circuit and a voltage adjusting circuit. The boosting circuit boosts a battery voltage to a first voltage, and supplies the first voltage to a first display device. The voltage adjusting circuit adjusts the first voltage to a second voltage, and supplies the second voltage to a second display device.

A dual panel apparatus according to one embodiment of the present invention includes a first display device, a second display device and an apparatus for supplying power source. The apparatus for supplying power source supplies a first voltage to the first display device, and supplies a second voltage different from the first voltage to the second display device.

A method of supplying power source in a dual panel apparatus according to one embodiment of the present invention includes boosting a battery voltage to a first voltage; supplying the first voltage to a first display device; adjusting the first voltage to a second voltage smaller than the first voltage; and providing the second voltage to a second display device.

As described above, the apparatus for supplying power source of the present invention supplies a voltage outputted from a boosting circuit to a first display device, downs the voltage using a voltage adjusting circuit, and then supplies the downed voltage to a second display device. In other words, the apparatus of the present invention may provide voltages having different magnitude to a plurality of display devices, respectively.

BRIEF DESCRIPTION OF THE DRAWINGS

The above and other features and advantages of the present invention will become readily apparent by reference to the following detailed description when considered in conjunction with the accompanying drawings wherein.

DESCRIPTION OF EMBODIMENTS

Hereinafter, the preferred embodiments of the present invention will be explained in more detail with reference to the accompanying drawings.

Figure 1:
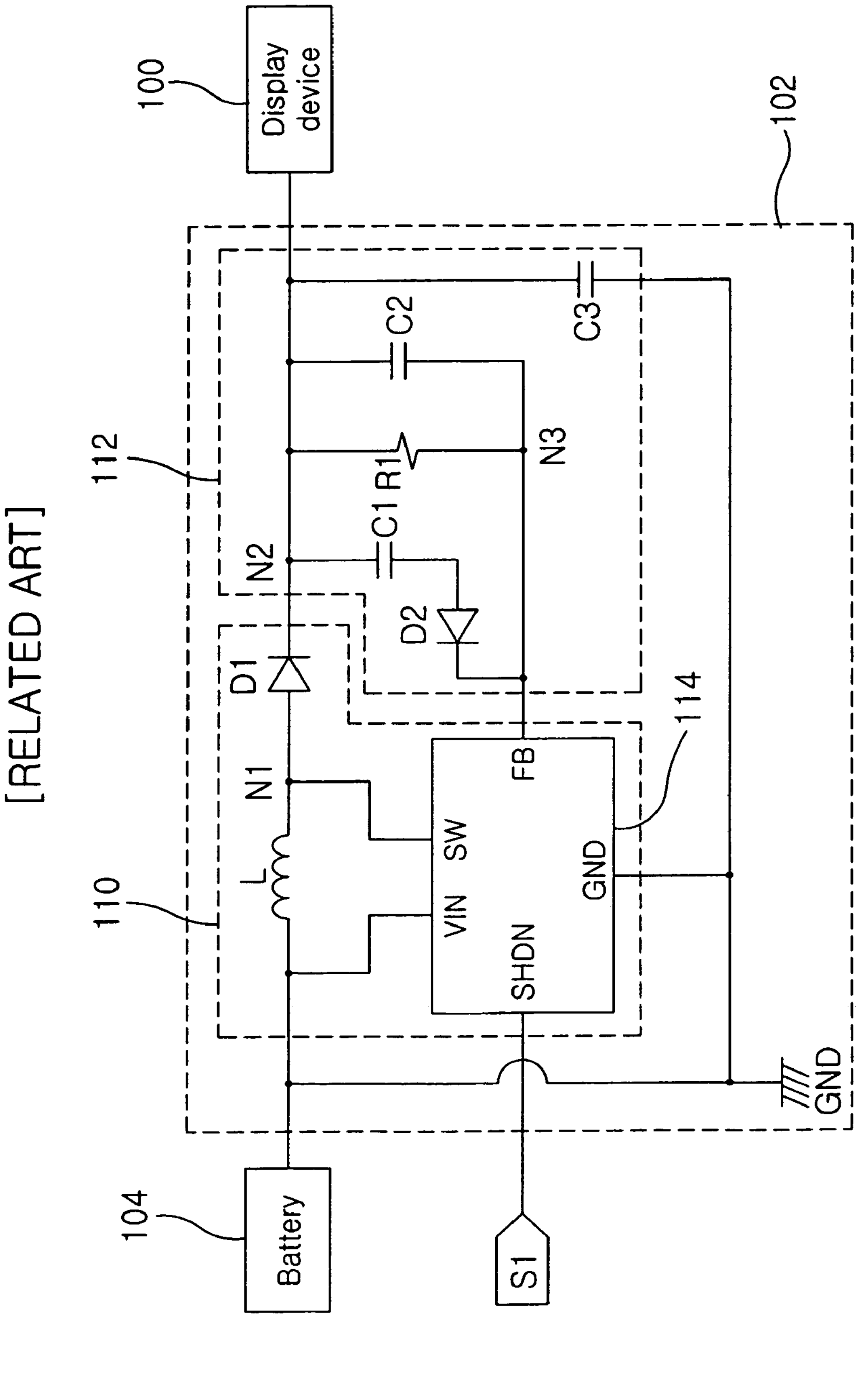
FIG. 1 is a view illustrating a circuitry of a common apparatus for supplying power source.
Figure 2:
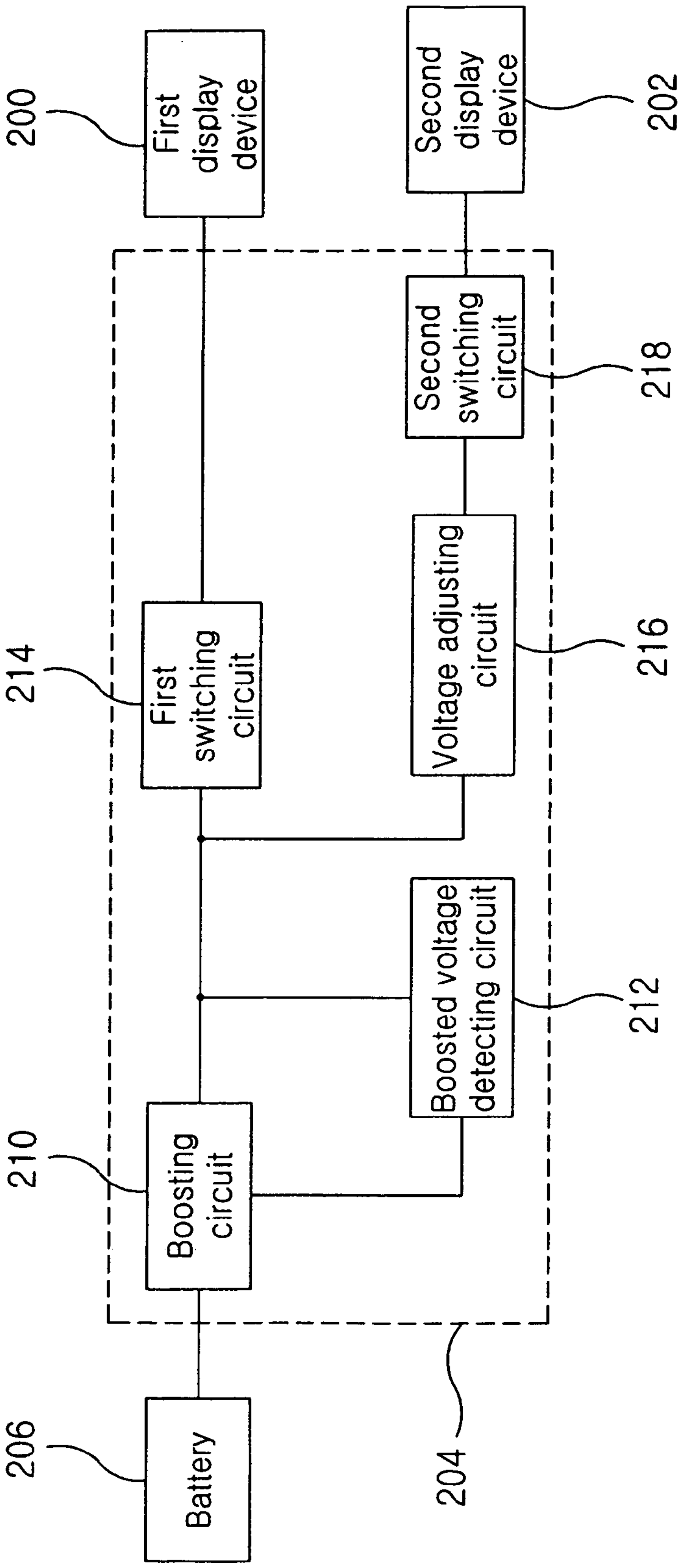
FIG. 2 is a block diagram illustrating an apparatus for supplying power source according to one embodiment of the present invention.

FIG. 2 is a block diagram illustrating an apparatus for supplying power source according to one embodiment of the present invention.

In FIG. 2, the apparatus for supplying power source 204 of the present invention includes a boosting circuit 210, a boosted voltage detecting circuit 212, a first switching circuit 214, a voltage adjusting circuit 216 and a second switching circuit 218. The apparatus 204 according to another embodiment of the present invention may include further a battery 206.

The boosting circuit 210 boosts a battery voltage provided from the battery 206 up to a desired voltage, and provides the boosted battery voltage to a first display device 200 and/or a second display device 202. Here, the display devices 200 and 202 in the present invention may be employed in a dual panel apparatus.

In one embodiment of the present invention, the first display device 200 is liquid crystal display (hereinafter, referred to as "LCD"), and the second display device 202 is organic electroluminescent device.

In another embodiment of the present invention, the display devices 200 and 202 are organic electroluminescent devices. Also, a plasma display panel (hereinafter, referred to as "PDP"), etc. may be admittedly employed as the display devices 200 and 202.

In still another embodiment of the present invention, the first display device 200 is main display device in a dual panel apparatus, and the second display device 202 is sub-display device in the dual panel apparatus.

The boosted voltage detecting circuit 212 detects magnitude of the battery voltage boosted by the boosting circuit 210, and transmits the detection result to the boosting circuit 210. In this case, the boosting circuit 210 analyzes the detection result transmitted from the boosted voltage detecting circuit 212, and adjusts its boosting ratio, e.g. its duty ratio in accordance with the analysis.

Hereinafter, a voltage provided to the first display device 200 is assumed to be designed to have about 18V.

The boosting circuit 210 boosts a battery voltage of about 3.7V, and thus the battery voltage is boosted up to, for example about 17.5V. In this case, the boosted voltage detecting circuit 214 detects the battery voltage boosted up to 17.5V, and transmits the detection result to the boosting circuit 210.

Subsequently, the boosting circuit 210 detects that the battery voltage is boosted up to 17.5V through the detection result, and increases its boosting ratio in order to boost the battery voltage up to about 18V. For example, in case that the boosting circuit 210 boosts the battery voltage through on/off ratio of switch included therein, i.e. duty ratio, the boosting circuit 210 increases the duty ratio in accordance with the detection.

In short, the apparatus 204 of the present invention supplies a desired voltage to the first display device 200 through the above process.

The first switching circuit 214 switches couple between the boosting circuit 210 and the first display device 200.

The voltage adjusting circuit 216 adjusts the boosted battery voltage to a voltage having magnitude different from the boosted battery voltage. It is desirable that the voltage adjusting circuit 216 downs the boosted battery voltage.

The second switching circuit 218 switches couple between the voltage adjusting circuit 216 and the second display device 202.

In brief, unlike the apparatus 102 in Related Art, the apparatus 204 of the present invention may supply power source to a plurality of display devices 200 and 202. Accordingly, the size of a dual panel apparatus employing the apparatus 204 may be smaller than that in Related Art.

Figure 3:
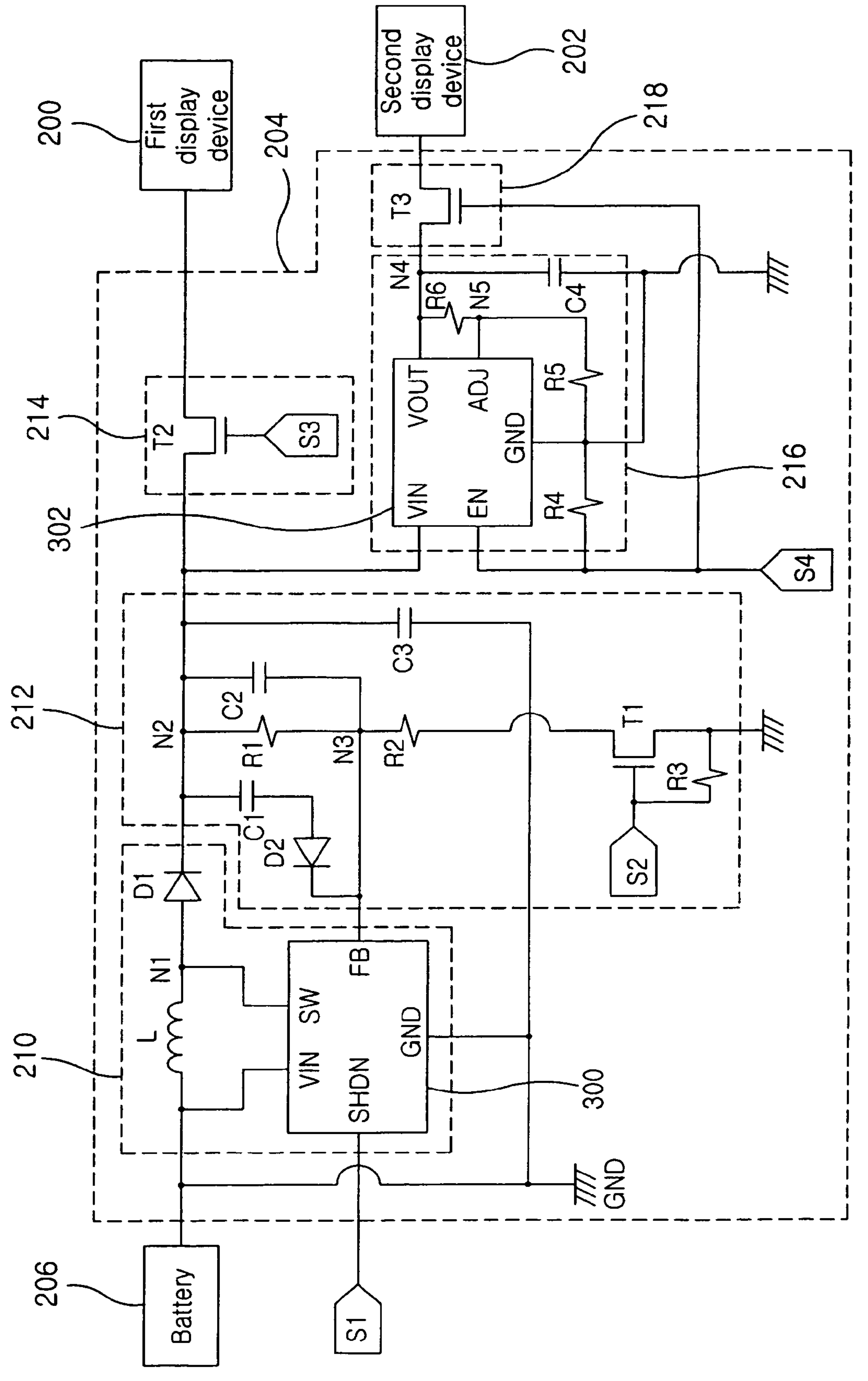
FIG. 3 is a view illustrating circuitry of the apparatus for supplying power source of FIG. 2 according to one embodiment of the present invention.

FIG. 3 is a view illustrating circuitry of the apparatus for supplying power source of FIG. 2 according to one embodiment of the present invention.

In FIG. 3, the boosting circuit 210 includes a boosting integrated chip 300, an inductor L and a first diode D1, and may be embodied with MIC2238 integrated chip.

The boosting integrated chip 300 boosts a battery voltage provided from the battery 206 by using switch (not shown) included therein as described below.

Firstly, the switch is turned off, and so the battery voltage is stored in the inductor L.

Subsequently, the switch is turned on, and so charges charged in the inductor L are outputted to a first node N1.

Then, the switch is turned off, and thus the battery voltage is stored in the inductor L.

In other words, the switch is repeatedly turned on/off, and so the battery voltage is boosted. As a result, the first node N1 has the boosted battery voltage. Here, the on/off ratio of the switch means duty ratio.

Subsequently, in case that the boosted battery voltage is more than threshold voltage of the first diode D1, current outputted from the inductor L passes through the first diode D1, and so a second node N2 has the boosted battery voltage.

Hereinafter, elements in the apparatus 204 will be continuously described.

The boosted voltage detecting circuit 212 includes a first capacitor C1, a second diode D2, a first resistor R1, a second resistor R2, a first transistor T1 (for example, MOS transistor), a second capacitor C2 and a third capacitor C3.

The first capacitor C1 is coupled to the boosting circuit 210, and the second diode D2 is coupled to the first capacitor C1 and the boosting integrated chip 300. This first capacitor C1 and second diode D2 make voltage inputted to a feedback terminal FB of the boosting integrated chip 300, i.e. voltage of a third node N3 stabilize.

The first resistor R1 is coupled to the boosting circuit 210, and the second resistor R2 is selectively coupled to the first resistor R1. Particularly, the second resistor R2 is coupled in serial to the first resistor R1 when the first transistor T1 is turned on in accordance with a first controlling signal transmitted from a second signal terminal S2. However, the second resistor R2 is not coupled to the first resistor R1 when the first transistor T1 is turned off. Accordingly, the voltage of the third node N3 is changed depending on couple condition of the resistors R1 and R2. In addition, though boosting ratio of the boosting integrated chip 300 is the same, the voltage outputted from the boosting circuit 210, i.e. the voltage of the second node N2 is changed depending on the couple condition of the resistors R1 and R2. Hence, in the apparatus 204 of the present invention, the boosting circuit 210 may output voltages having different magnitude using the same boosting ratio.

A third resistor R3 may be coupled between gate terminal of the first transistor T1 and a ground in order to protect the first transistor T1.

The second and third capacitors C2 and C3 make the voltage provided to the first display device 200, i.e. voltage of the second node N2 stabilize.

Hereinafter, a process of boosting the battery voltage provided from the battery 206 using the boosting circuit 210 will be described in detail. Here, it is assumed to be designed to boost the battery voltage, for example about 3.7V up to about 18V. In this case, the voltage of the third node N3 is designed to have about 9V.

When the battery voltage boosted by the boosting circuit 210 is 16V, the boosted voltage detecting circuit 212 detects that a voltage of the third node N3 is 8V.

Subsequently, the boosted voltage detecting circuit 212 provides the detected voltage of the third node N3 to FB of the boosting integrated chip 300. In this case, the boosting integrated chip 300 detects that the battery voltage is not boosted up to a desired voltage, i.e. 18V through the provided voltage of the third node N3. Accordingly, the boosting integrated chip 300 adjusts duty ratio of the switch so that the boosted battery voltage is 18V.

Hereinafter, elements in the apparatus 204 will be continuously described.

The first switching circuit 214 includes a second transistor T2, e.g. MOS transistor. Additionally, the first switching circuit 214 switches couple between the boosting circuit 212 and the first display device 200 in accordance with on/off of the second transistor T2, and so provides the voltage outputted from the boosting circuit 210, i.e. voltage of the second node N2 to the first display device 200. Here, the second transistor T2 is turned on/off in accordance with a second controlling signal transmitted from a third signal terminal S3. Moreover, the second transistor T2 according to one embodiment of the present invention is N-MOS transistor.

The voltage adjusting circuit 216 includes a low dropout regulator (hereinafter, referred to as "LDO regulator") for downing the voltage outputted from the boosting circuit 210, a fifth resistor R5 coupled between a ground terminal GND and an output voltage adjusting terminal ADJ of the LDO regulator 302, and a sixth resistor R6 coupled between the ADJ of the LDO regulator 302 and the second switching circuit 218.

The voltage adjusting circuit 216 adjusts the output voltage of the boosting circuit 210 inputted into a voltage input terminal VIN of the LDO regulator 302 by using the fifth and sixth resistors R5 and R6 coupled to the ADJ of the LDO regulator 302. In particular, when a third controlling signal is inputted from a fourth signal terminal S4 coupled to an enable terminal EN of the LDO regulator 302, the LDO regulator 302 is turned on, and then the output voltage of the boosting circuit 210 is inputted to the LDO regulator 302. As a result, the LDO regulator 302 downs the output voltage of the boosting circuit 302 to a desired voltage in accordance with the fifth and sixth resistors R5 and R6.

In addition, the voltage adjusting circuit 216 may include further a fourth resistor R4 and a fourth capacitor C4 for stabilizing an output voltage of the LDO regulator 302 provided to the second display device 202.

The fourth resistor R4 as full down resistor is coupled between the EN and the ground terminal GND of the LDO regulator 302, and stabilizes a digital signal inputted to the ground terminal GND of the LDO regulator 302.

The second switching circuit 218 includes a third transistor T3, e.g. MOS transistor. Additionally, the second switching circuit 218 switches couple of the LDO regulator 302 and the second display device 202 in accordance with on/off of the third transistor T3, and thus provides the output voltage of the LDO regulator 302, i.e. voltage of a fourth node N4 to the second display device 202. Here, the third transistor T3 is turned on/off in accordance with a fourth controlling signal transmitted from a fourth signal terminal S4. Further, the third transistor T3 according to one embodiment of the present invention is N-MOS transistor.

In short, the apparatus 204 of the present invention may provide voltages having different magnitude to the first display device 200 and the second display device 202, respectively.

The apparatus 204 according to one embodiment of the present invention drives selectively the switching circuit 214 and 218, thereby providing corresponding voltage to the first display device 200 or the second display device 202.

The apparatus 204 according to another embodiment of the present invention may drive the switches 214 and 218 together, thereby providing a first voltage and a second voltage to the first display device 200 and the second display device 202, respectively.

From the preferred embodiments for the present invention, it is noted that modifications and variations can be made by a person skilled in the art in light of the above teachings. Therefore, it should be understood that changes may be made for a particular embodiment of the present invention within the scope and the spirit of the present invention outlined by the appended claims.

What is claimed is:

1. An apparatus for supplying power source comprising:

a boosting circuit configured to boost a battery voltage to a first voltage, and supply the first voltage to a first display device and a boosted voltage detecting circuit via an output terminal of the boosting circuit;

the boosted voltage detecting circuit configured to detect magnitude of the first voltage boosted by the boosting circuit, and provide a detected result to a feedback terminal of the boosting circuit, wherein the boosted voltage detecting circuit includes a first resistor having one end coupled to the output terminal of the boosting circuit, a second resistor having one end selectively coupled to another end of the first resistor, and a first transistor coupled between another end of the second resistor and a ground terminal, wherein the feedback terminal of the boosting circuit is coupled to a connection node between the first resistor and the second resistor, the second resistor is coupled in serial to the first resistor when the first transistor is turned on, and the second resistor is disconnected from the first resistor when the first transistor is turned off;

a voltage adjusting circuit configured to adjust the first voltage supplied from the boosting circuit to a second voltage different from the first voltage according to a first control signal, and supply the second voltage to a second display device;

a first switching circuit configured to switch couple the boosting voltage detecting circuit and the first display device; and a second switching circuit configured to switch couple the voltage adjusting circuit and the second display device, wherein the boosting circuit analyzes the detected result supplied from the boosted voltage detecting circuit and adjusts a boosting ratio thereof in accordance with an analyzed result in order to boost the battery voltage to an adjusted first voltage, wherein the first switching circuit provides the adjusted first voltage to the first display device according to a second control signal, and wherein the second switching circuit provides the second voltage to the second display device according to the first control signal.

2. The apparatus of claim 1, wherein the second voltage is smaller than the first voltage.

3. The apparatus of claim 1, wherein at least one of the first and second switching circuits include MOS transistor.

4. The apparatus of claim 1, wherein the first switching circuit or the second switching circuit is turned-on.

5. The apparatus of claim 1, wherein the voltage adjusting circuit includes:

a LDO regulator coupled between the boosted voltage detecting circuit and the second switching circuit;

a first and second resistor R4 and R5 coupled in parallel to a ground terminal (GND) of the LDO regulator;

a third resistor R6 coupled to an output terminal (VOUT) of the LDO regulator; and a capacitor connected between the ground terminal and the output terminal.

6. The apparatus of claim 1, further comprising:

a battery configured to provide the battery voltage to the boosting circuit.

7. The apparatus of claim 1, wherein at least one of the first display device and the second display device is organic electroluminescent device.

8. The apparatus of claim 1, wherein the first display device is main display device, and the second display device is sub display device.

9. A dual panel apparatus comprising:

a first display device;

a second display device;

an apparatus for supplying power source configured to supply a first voltage to the first display device, and supply a second voltage different from the first voltage to the second display device, wherein the apparatus for supplying power source includes:

a boosting circuit configured to boost a battery voltage to the first voltage;

a boosted voltage detecting circuit configured to detect magnitude of the first voltage boosted by the boosting circuit, and provide a detected result to a feedback terminal of the boosting circuit, wherein the boosted voltage detecting circuit includes a first resistor having one end coupled to the output terminal of the boosting circuit, a second resistor having one end selectively coupled to another end of the first resistor, and a first transistor coupled between another end of the second resistor and a ground terminal, wherein the feedback terminal of the boosting circuit is coupled to a connection node between the first resistor and the second resistor, the second resistor is coupled in serial to the first resistor when the first transistor is turned on, and the second resistor is disconnected from the first resistor when the first transistor is turned off;

a voltage adjusting circuit configured to adjust the first voltage supplied from the boosting circuit to a second voltage according to a first control signal;

a first switching circuit configured to switch couple the boosting circuit voltage detection and the first display device; and a second switching circuit configured to switch couple of the voltage adjusting circuit and the second display device, wherein the boosting circuit analyzes the detected result supplied from the boosted voltage detecting circuit and adjusts a boosting ratio thereof in accordance with an analyzed result in order to boost the battery voltage to an adjusted first voltage, wherein the first switching circuit provides the adjusted first voltage to the first display device according to a second control signal, and wherein the second switching circuit provides the second voltage to the second display device according to the first control signal.

10. The dual panel apparatus of claim 9, wherein the voltage adjusting circuit includes an LDO regulator coupled to the boosting circuit, and adjusts the first voltage to the second voltage by using the LDO regulator.

11. The dual panel apparatus of claim 9, wherein each of the first and second switching circuits includes MOS transistor, wherein one or more of the MOS transistors are N-MOS transistor.

12. The dual panel apparatus of claim 9, wherein one or more of the first display device and the second display device are organic electroluminescent device.

13. The dual panel apparatus of claim 9, wherein the apparatus for supplying power source provides corresponding voltage to one selected from a group comprising the first display device and the second display device.

14. The dual panel apparatus of claim 9, wherein the first display device is main display device, and the second display device is sub display device.

* * * * *